Aug. 11, 1959 P. A. M. GELL 2,899,476
METHOD OF AND FURNACE FOR MELTING AND REFINING GLASS
Filed Nov. 6, 1956 5 Sheets-Sheet 1
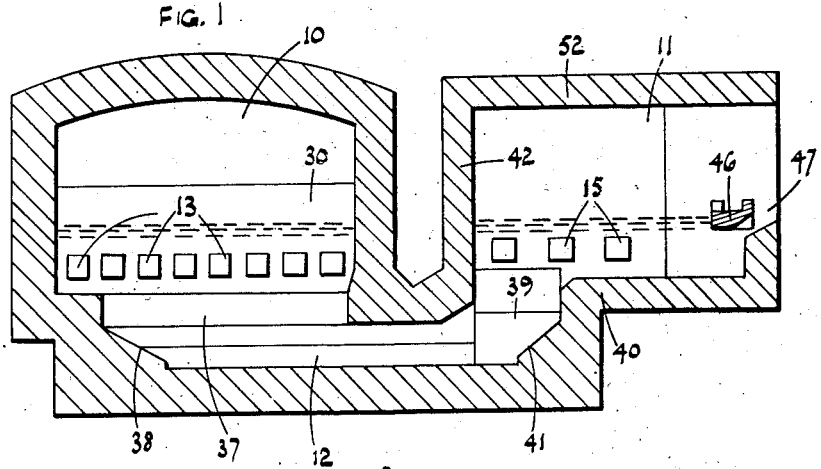
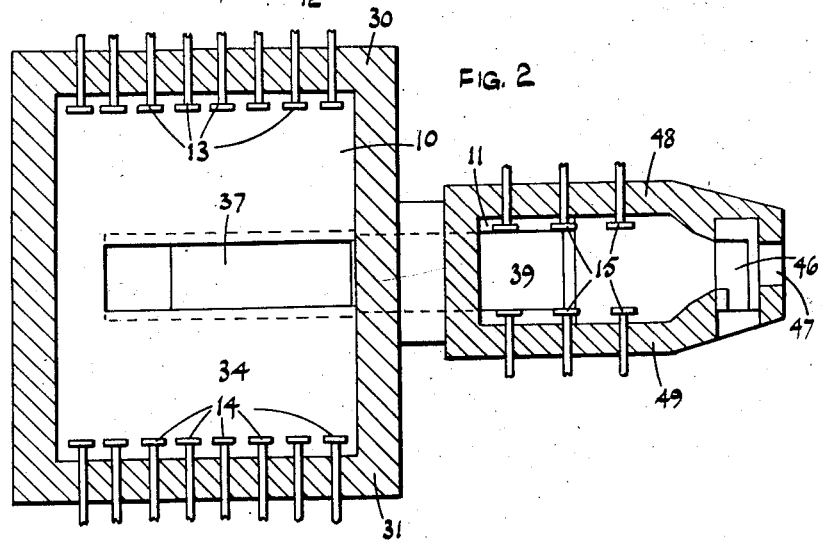
INVENTOR
Philip Antony Maunsell Gell
BY A. John Michel
ATTORNEY Aug. 11, 1959   P. A. M. GELL   2,899,476
METHOD OF AND FURNACE FOR MELTING AND REFINING GLASS
Filed Nov. 6, 1956   5 Sheets-Sheet 2
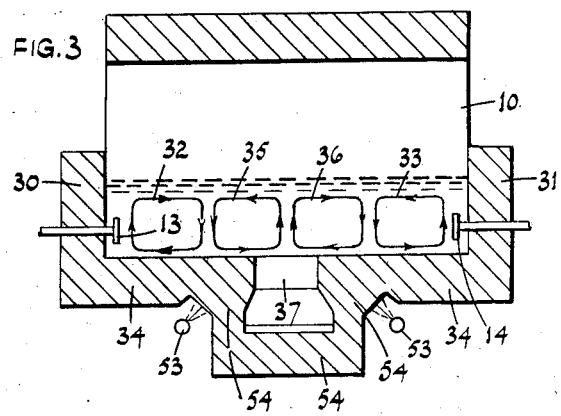
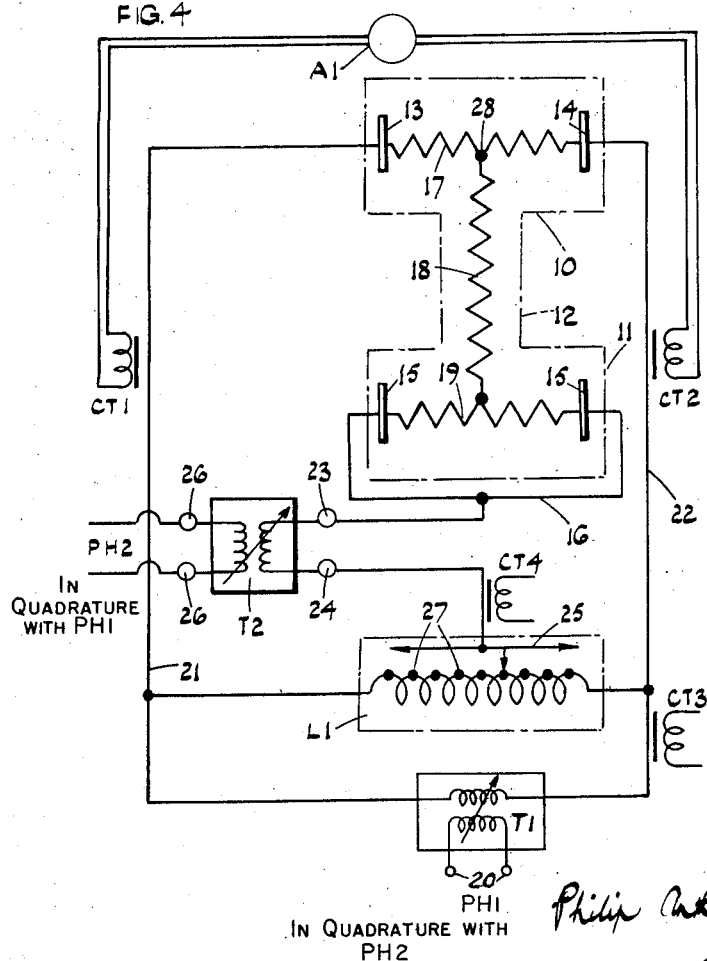
INVENTOR
Philip Antony Maunsell Gell
BY A. John Michel
ATTORNEY Aug. 11, 1959 P. A. M. GELL 2,899,476
METHOD OF AND FURNACE FOR MELTING AND REFINING GLASS
Filed Nov. 6, 1956 5 Sheets-Sheet 3

INVENTOR
Philip Anthony Maunsell Gell
BY

ATTORNEY

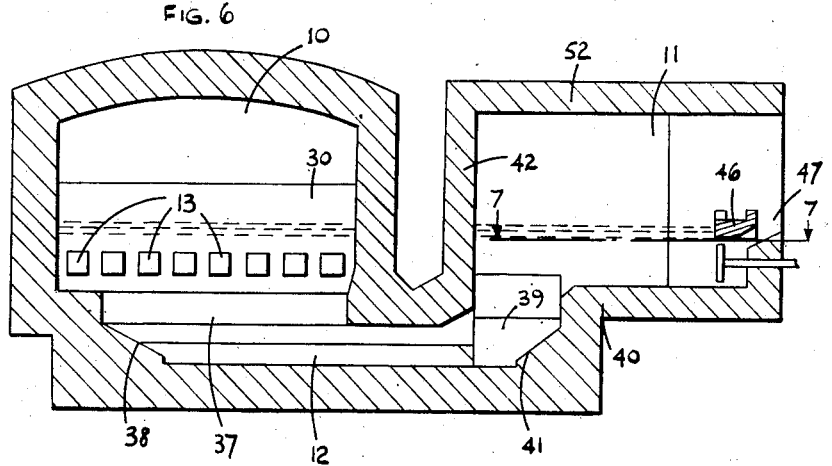
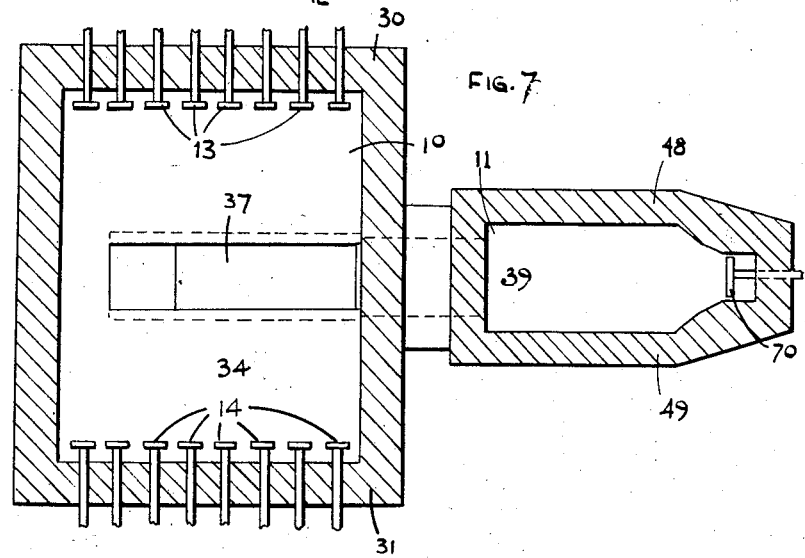

Aug. 11, 1959 P. A. M. GELL 2,899,476
METHOD OF AND FURNACE FOR MELTING AND REFINING GLASS
Filed Nov. 6, 1956 5 Sheets-Sheet 5
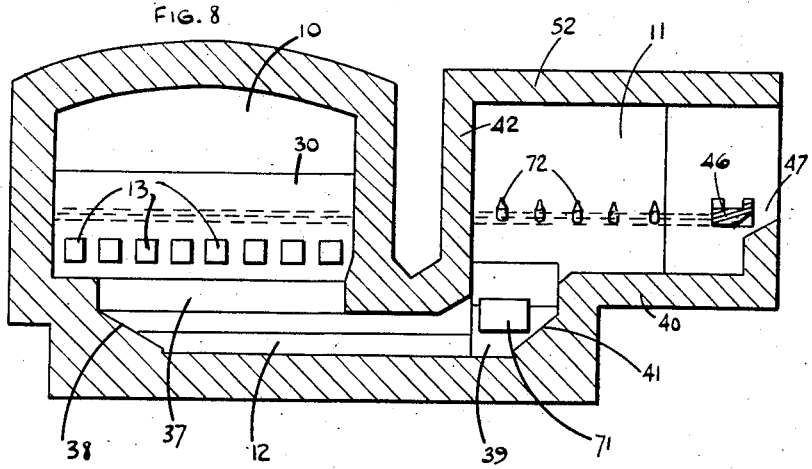
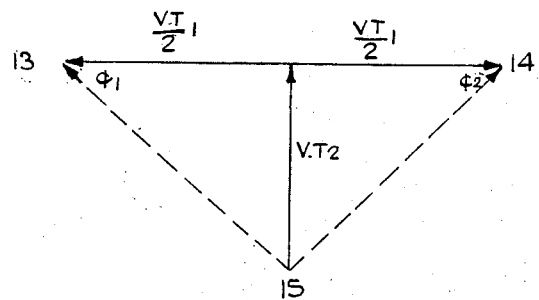
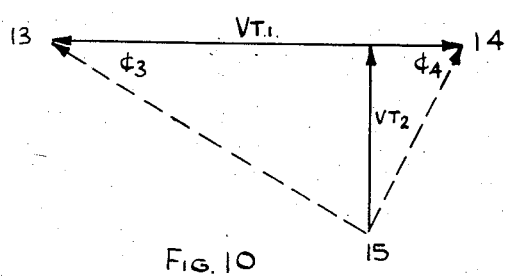
INVENTOR
Philip Anthony Maunsell Gell
BY
ATTORNEY

United States Patent Office 2,899,476
Patented Aug. 11, 1959

2,899,476

METHOD OF AND FURNACE FOR MELTING AND REFINING GLASS

Philip Anthony Maunsell Gell, Caynton, near Shifnal, England, assignor to Elemelt Limited, Bilston, England, a British company Application November 6, 1956, Serial No. 620,618

19 Claims. (Cl. 13—6)

The present invention relates to a method of and furnace for refining glass of the kind wherein the glass is heated by the passage of an alternating electric current therethrough.

Previous proposals for the refining of glass in this manner have been made wherein the batch materials (i.e. the unmolten and generally powdered constituents from which the glass is formed) are fed into a furnace chamber through the top, so as gradually to become absorbed into the surface layer of molten glass contained in such chamber, thereafter the glass being drawn downwards in the chamber (whilst an electric current is caused to pass through the glass from side to side) by the pull induced by withdrawal of the glass from the lower portion of the furnace chamber through a side wall aperture of small cross-sectional area compared with the cross-sectional area in plan of the chamber itself.

In another proposal the furnace chamber has a narrow slot in its bottom wall for the outlet of the glass into a well from which it is ultimately fed out through an orifice at the bottom of the well.

One of the problems encountered in glass refining is the elimination or reduction of "seed" in the glass which is fed out of the furnace for fabrication, the term "seed" being commonly understood in the art as meaning small bubbles of air or other gas which are generated or become entrapped in the glass owing to its viscosity.

Furnaces in these forms previously proposed do not eliminate seed or reduce it to the extent which is practically desirable. I believe that the main reason for this is that these furnaces are designed to provide for extraction of glass from the furnace chamber over a relatively small area, and if therefore the furnaces are operated at a commercially acceptable rate, glass which has not yet undergone sufficient refining is withdrawn indiscriminately with glass which has undergone sufficient refining because the extraction force overrides any tendency for certain insufficiently refined portion of glass to continue circulating.

One object of the present invention is to provide a new or improved method of refining glass and furnace for performing this method which will enable the quality of the glass produced (i.e. fed out of the furnace) to be improved with respect to its seed content.

The present invention also relates to methods of and furnaces for melting or refining glass of the kind wherein the glass is heated by the passage of alternating electric current therethrough, such furnaces comprising a furnace chamber and a further chamber which is connected with the furnace chamber by a duct through which the molten glass and an auxiliary alternating electric current can be caused to flow.

The furnace chamber may be a melting chamber into which the batch materials in solid form are fed and melted, in which case the further chamber is either a refining chamber (no refining or only partial refining taking place in the melting chamber). Alternatively the furnace chamber may be both a melting chamber and a refining chamber, the further chamber then being a storage chamber such as a forehearth from which the glass refined in the furnace chamber is fed out directly or indirectly for fabrication. Alternatively the furnace chamber may be a refining chamber (which has been preceded by a melting chamber) and the further chamber may be either a further refining chamber or a storage chamber such as a forehearth.

I have found that even when there is a satisfactory degree of uniformity in the temperature of the glass taken over a transverse cross section of the duct adjacent to the furnace chamber, molten glass present in the further chamber does not invariably exhibit the same satisfactory degree of uniformity in respect of temperature throughout its cross section and careful measurement has shown that this disturbance of the temperature distribution exists over a transverse cross section of the glass in the duct adjacent to the further chamber.

I attribute this disturbance to the existence of instability in the distribution of current taken over a transverse cross section of the glass in the duct which connects the melting and refining chamber with the further chamber.

If some extraneous influence produces at a certain time a decrease in temperature at one particular locality of the cross section of the glass in the duct, the electrical resistance offered by the elemental length of "rod" of glass passing through this locality will increase, and in consequence the current will decrease thereby further reducing the temperature at this locality whilst at other localities of the cross section the temperature of the glass is maintained or even increased.

In practice this tendency for the current to become concentrated in a particular region of the cross section occurs wholly or predominantly as a side-by-side shift in the duct, the side-to-side shift being parallel or approximately so to the main current path traversing the opening in the furnace chamber between the main electrodes thereof which opening gives access to the duct.

Non-uniformity as to temperature over a cross section of the glass in the further chamber may also be caused or accentuated by asymmetrical heating of the glass in the furnace chamber with respect to the centre point of the opening in this chamber through which the glass is withdrawn into the duct. If the glass between one of the main electrodes of the furnace chamber and this centre point is heated to a greater temperature than the glass between the other of the main electrodes in this chamber and this centre point, the auxiliary current flowing through the duct and dividing in the furnace chamber will encounter a path of lower resistance when flowing through the glass of the furnace chamber to one of the main electrodes therein than to the other (the lower resistance path being through the hotter glass). There will thus be a tendency to accentuate the asymmetrical heating and this in turn will further accentuate the tendency for the auxiliary current to become concentrated at one particular side of the duct.

Initial asymmetrical heating in the furnace chamber may occur if the main and auxiliary currents depart to an appreciable extent from a quadrature phase relationship. Whether this occurs or not depends to an appreciable extent upon the relative magnitude of the auxiliary current and the main current. If the auxiliary current is in phase, or is 180° out of phase, with the main current the value of the two currents flowing in the furnace chamber on opposite sides of the centre point of the opening will be determined by simple addition and simple subtraction of the main and auxiliary currents, and may therefore be unequal to an extent which will cause an appreciable asymmetry of heating if the auxiliary current is of a value to affect significantly the temperature of the glass in the furnace chamber.

The resultant deterioration of the uniformity of temperature distribution which occurs between the opening in the furnace chamber and the opening in the further chamber giving access to and egress from the duct respectively does in fact materially reduce the temperature uniformity of glass in the further chamber. When the latter is a forehearth from which glass is fed out directly or indirectly for use the quality of products made from such glass is impaired, particularly as to the uniformity of the characteristics of the glass contained therein which depend upon the temperature of the glass during its preparation for melting and refining for fabrication of the article concerned.

A further object of the invention is to provide a new or improved method of melting or refining glass or furnace for performing this method which will enable the quality of the glass produced or stored in the further chamber to be improved with respect to the uniformity of the temperature distribution.

The invention will now be described by way of example with reference to the accompanying drawings illustrating preferred embodiments thereof and wherein:

Figure 1 shows in cross section taken transversely of the furnace chamber one construction of a furnace in accordance with the invention for carrying out the methods thereof.

Figure 2 is a cross sectional view in plan of the same construction.

Figure 3 is a longitudinal cross section of the furnace chamber.

Figure 4 is a circuit diagram showing the supply circuits for the main and auxiliary electrodes.

Figure 6 is a fragmentary view similar to Figure 1 illustrating an alternative construction employing a single electrode in the further chamber placed symmetrically with respect to the opening in this chamber by which glass enters this chamber.

Figure 7 is a fragmentary plan view of the construction shown in Figure 6 on the line 7—7 thereof.

Figure 8 is a further fragmentary view similar to Figure 1 illustrating yet another alternative construction wherein electrodes are placed in the duct which connects the furnace chamber and the further chamber, the latter being equipped with gas burners.

Figure 9 is a vector diagram showing the voltage relationship in the main and auxiliary supply circuits feeding the main and auxiliary electrodes respectively when the total currents communicated to the main electrodes are equal, and Figure 10 is a diagram similar to Figure 9 showing the relationships when the total currents fed to the main electrodes are unequal.

Figure 5:
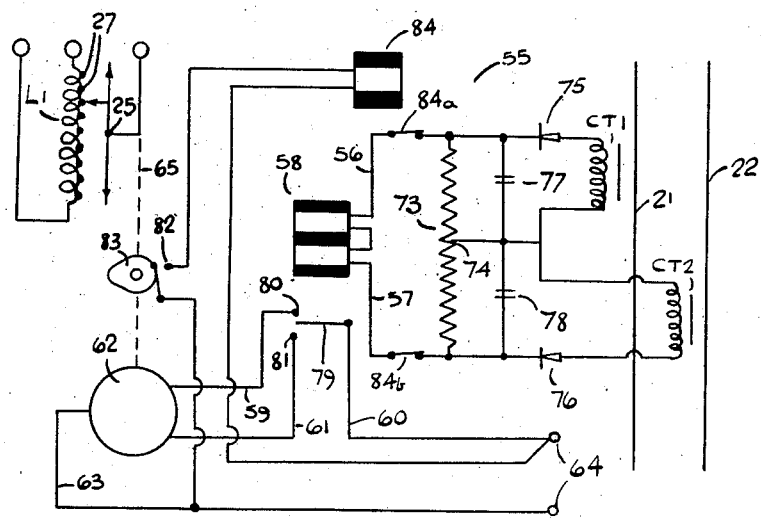
Figure 5 is a circuit diagram illustrating an alternative arrangement wherein the point of connection between the supply circuits for the main electrodes and auxiliary electrodes is adjusted by means of a servo-motor.

In the construction illustrated the furnace is provided with a furnace chamber 10 in which both melting and refining operations are conducted, that is to say the batch materials in solid form are heated until they liquefy and the molten body of glass undergoes refining in consequence of the temperature at which it is maintained.

It is to be understood, however, that the invention may be applied to furnaces in which refining is conducted in a chamber additional to that in which the batch materials are first melted (whether or not some refining is also conducted in this chamber). In such cases the invention may be applied either to the chamber in which the batch materials are first melted, or to the additional chamber, or to both such chambers according to the particular requirements of each case. The "further" chamber hereinbefore referred to would, in each case, be constituted by that chamber to which glass is fed out from the characteristically dimensioned opening in the bottom wall of the preceding chamber.

Referring now again to the illustrated construction the furnace chamber 10 may be of rectangular form in plan, the height of the chamber being determined by the volume of glass which is required to be present in the melting and refining chamber to satisfy both the requirements of throughput (i.e. glass delivered from the furnace in a given time) and refining duration (i.e. the length of time which the glass must remain in this chamber in order to be refined to a satisfactory degree). Typical dimensions for a throughput of 1,000 lbs. per hour are width 8 ft., length 9 ft. and height 2 ft. 6 inches.

Along each of the end walls 30 and 31 of this chamber are disposed electrodes 13 and 14 respectively affording a surface area sufficient to pass the required current into the glass at the current density required (say 2.5 amperes per square inch), the actual current supply into the glass being dependent upon the temperature which it is required to maintain for the glass in the chamber.

The electrodes may be constructed as described in U.S. patent application Ser. No. 608,092, filed September 5, 1956, by Douglas Graeme Hann, and are preferably spaced away from the end walls 30 and 31 by a short distance for example 4 inches to allow molten glass to pass behind the electrode face concerned and prevent this face and the supporting stem of the electrode from oxidising. It will be evident that the electrodes are spaced apart horizontally and that their current communicating faces occupy vertical planes.

With this arrangement of electrodes and the dimensions of the chamber in plan as specified two circulating convection currents are established adjacent to respective electrodes 13 and 14 as illustrated diagrammatically in Figure 3, one of these currents being indicated by the arrows 32 and the other by the arrows 33. As will be observed from Figure 3 each of these currents consists of a rising portion immediately adjacent to the current communicating face of the adjacent electrode, a horizontally extending portion at or near the surface of the molten glass moving away from this electrode and a descending portion spaced away from the electrode and a return horizontal portion near the bottom wall 34 of the chamber.

Owing to the existence of the locality of maximum temperature in the central region of the electrical path between the electrodes a further upward convection current tends to be established in this region which divides into two at or near surface so as to produce further circulating currents indicated by the arrows 35 and 36 which flow outwardly from each other near the surface and have descending portions adjacent to the descending portions and the currents 32 and 33.

This pattern of convection currents is established with a chamber of the dimensions above described and may occur notwithstanding substantial variations in the proportions of this chamber. It is believed, however, that it is necessary to space the horizontally opposed electrodes 13 and 14 sufficiently far apart to provide sufficient space between the central region of the path and each electrode 13 and 14 to admit of the establishment of the descending current portions of the four circulating currents indicated at 32, 33, 35 and 36.

The upwardly moving current of glass adjacent to each electrode 13 and 14 will ordinarily be found to contain a greater proportion of seed than is contained in the upwardly moving current of glass in the central region between the electrodes 13 and 14 because seed tends to be formed at the current communicating faces of the electrodes and furthermore because by the time the glass has reached the central region considerable opportunity has already been given to the seed to rise to the surface and disperse. Having regard to this consideration the glass is withdrawn from the furnace chamber through an opening 37 in the bottom wall of the furnace situated in the central region so that by withdrawing glass through this opening a downward pull is exerted upon the glass contained in the central region above this opening where there is an upwardly rising convection current.

This downward pull is arranged to be exerted over a substantial cross-sectional area of the glass as seen in plan by making the opening of appropriately large dimensions. It is believed necessary or at any rate desirable that the length of this opening measured parallel to the current path between the electrodes 13 and 14 should be at least equal to ⅛ of the length of this current path in order to avoid exerting a downward pull which is too concentrated and severe such as would tend to withdraw seed containing glass into the opening, whilst the maximum length of the path should preferably not exceed one half of the length of the current path assumed to be equal to the horizontal spacing between the electrodes 13 and 14. For the furnace dimensions previously given the length of this opening may be 1 ft. 3 inches.

The term "length" means the dimension of the opening measured parallel to the direction of the current flow in the furnace chamber but it will be appreciated that this dimension may in fact be less than the "width." The term "end" means the edges of the opening which are perpendicular or generally transverse to the direction of current flow between the electrodes of the furnace chamber.

The opening may extend for the whole width of the bottom wall of the chamber or a substantial proportion thereof and should not in any case be less than half of the width of the furnace chamber in order to avoid too severe or concentrated a pull being exerted upon the glass. It will be appreciated that where the length of the opening is increased to something approaching half the horizontal spacing between the electrodes 13 and 14, the pattern of convection currents may be modified so that the descending portions are shifted nearer to the electrodes 13 and 14.

The operation of the furnace so far as the flow of glass in the region immediately above the opening 37 is concerned is thus caused by the establishment of a downward pull (caused by withdrawal of glass downwardly through the opening) which is exerted upon the elemental volumes of glass which collectively make up the body of glass in this region in opposition to an upthrust acting on these elemental volumes to promote upward convection flow. The magnitude of the upthrust may be varied by controlling the temperature in the central region of the furnace chamber (higher temperatures promote a stronger convection flow and lower temperatures a weaker convection flow) by varying the magnitude of the electric current traversing the glass in the furnace chamber between the electrodes 13 and 14. The magnitude of the downward pull is controlled by varying the rate of withdrawal of the glass through the opening, proper operating conditions being attained when there exists a controlled preponderance of downward pull over upthrust and a sufficient degree of fluidity of the glass to result in the downward extraction of elemental volumes of glass having not more than a certain seed content whilst permitting upward progression of other elemental volumes of glass having a greater seed content for further circulation and refining in the furnace chamber.

The conception of "elemental volumes" is adopted in the statement of invention set forth above in order to clarify the nature of the dynamic conditions pertaining in the central region. In practice, it will be understood that there will not ordinarily be abrupt division between the downwardly extracted and upwardly progressing elemental volumes but rather an upward component of flow dispersed throughout the horizontal cross-section of the central region, and a similarly dispersed component of downward flow according to the seed density at any particular location, and the expression "elemental volume" is accordingly to be interpreted broadly to embrace this dispersion of downward and upward movement.

The seed content which is acceptable in any particular case varies considerably depending upon the use to which the glass so refined is to be put. For glass intended to be used for window panes whereof the surface is of figured form, as for example of "Flemish" pattern, the presence of visible seed is not objectionable whereas in the case of glass intended for optical use, as for example the manufacture of lenses, there should be no visible or almost no visible seed. In each case therefore "sufficiently refined" glass (as to seed content) is deemed to be glass in which the volumetric quantity, number, and distribution of seeds is such as will not significantly impair the useful properties of the glass in relation to the use to which it is required to be put.

Beneath the opening 37 is disposed one end of a duct 12 extending laterally of the furnace chamber, this duct 12 underlying the whole width of the opening 37 and being of substantially equal or somewhat greater cross-sectional dimensions measured parallel to the length of the opening. The floor of the duct 12 may be inclined upwardly as indicated at 38 to meet the lateral edge of the opening 37.

At its opposite end the duct communicates with a further chamber 11. This may be a forehearth including a feeder device (not illustrated) of conventional form for feeding out the refined glass for use, such for example as for the performance of pressing, blowing, rolling or drawing operations to make glass-ware. The feeder device is capable of operation at different rates to vary the throughput as required by any particular product forming apparatus.

It is to be understood that the "further chamber" need not necessarily be the last chamber which the glass occupies before undergoing some form of fabrication. For instance in a furnace having a melting chamber (in which some refining may be conducted) and a separate refining chamber followed by a forehearth, the refining chamber may constitute the "further chamber" with respect to the melting chamber.

Also it is sometimes the case that glass is not fed directly out of the forehearth for fabrication; it may pass through a long tunnel-like chamber before being fed from an outlet, primarily for the purpose of controlling the temperature of the glass at said outlet more closely than would otherwise be the case.

Reference herein to the feeding out of the glass from the further chamber for use is therefore to be deemed to mean either direct or indirect feeding out, as may be appropriate.

Referring again to the illustrated embodiment, the duct 37 communicates with this further chamber 11 by way of an opening 39 in the bottom wall 40 thereof, the floor of the duct inclining upwardly as indicated at 41 beneath this opening.

It will be observed that the opening 39 is disposed adjacent to the side wall 42 of the further chamber 11 which is nearest the furnace chamber 10. In the further chamber 11 may be disposed a skimmer block 46, the glass finally passing to an outlet indicated at 47.

Adjacent to opposite walls 48 and 49 of the further chamber are disposed electrodes 15, the arrangement being such that these are symmetrical with respect to the opening 39 and electrical current paths through the glass from the electrodes 13 and 14 through the duct 12 and thence through the glass in the further chamber 11.

The chamber 11 may be enclosed by a crown 52.

Referring now to the electrical supply circuits for the various electrodes, Figure 4 shows in plan a diagrammatic representation of the furnace chamber 10, the duct 12 and the further chamber 11 as indicated by the broken line boundary.

The electrodes 15 of the further chamber 11 are strapped together electrically as indicated by the connection 16.

I have indicated diagrammatically the electrical resistance load obtaining between the several electrodes by a resistance element 17 representing the resistance afforded by the molten glass contained in the chamber 10, by a resistance element 18 representing the resistance afforded by the molten glass contained in the duct 12, and by a branched resistance element 19 representing the electrical resistance afforded by the molten glass contained in the chamber 11.

The main electrodes 13 and 14 are connected to a main supply circuit including an alternating current source which may be in the form of a single phase transformer T1 whereof the primary is connected to input terminals 20 fed from one phase of an alternating current supply, the secondary of this transformer being connected by leads 21 and 22 to the electrodes 13 and 14 respectively.

The auxiliary electrodes 15 are connected to an auxiliary supply circuit by way of their strap connection 16. Such auxiliary supply circuit includes a further transformer T2 to one pole 23 of the secondary winding of which the electrodes 15 are connected, the other pole 24 of the secondary winding being connected in parallel with the main electrodes 13 and 14 across the secondary of the transformer T1.

Primary terminals 26 of the transformer T2 are preferably energised from a further phase of an alternating current supply, the voltage of this phase being in quadrature with that from which the terminals 20 of the transformer T1 are fed. This produces a quadrature or approximately quadrature phase relationship between the main current flowing between electrodes 13 and 14 (on account solely of the voltage supplied from transformer T1) through the glass represented by the resistance element 17 and the auxiliary current flowing between the electrodes 15 on the one hand, and the point 28 represented by the junction of the resistance element 18 with the resistance element 17 on the other hand. An exactly quadrature relationship ensures that at any given instant the magnitudes (but not necessarily the phases) of the total resultant currents in the resistance element 17, that is in the glass in the furnace chamber on opposite sides of the point 28, are equal but some departure can be tolerated from this relationship without setting up any undesirable asymmetry in the heating effect produced in the furnace chamber on opposite sides of the point 28. Thus for a case where the auxiliary current is small compared with the main current (say in the ratio 1 to 16) a departure from quadrature relationship of the order of plus or minus 30 degrees may obtain without resulting in any undesirable inequality of heating in the two halves of the furnace chamber 10.

The auxiliary supply circuit further includes an inductance L1 provided with a plurality of tapping points 27 lying on both sides of the mid-point of the inductance and the slider 25 may be adjusted to contact with any one of these tapped points.

The central tapping point of the inductance L1 is the electrical centre between the electrodes 13 and 14 and has at any instant an electrical potential which is the same as that obtaining at the point 28 where the resistance element 18 may be considered as joining the resistance element 17 and which in reality represents the centre of the opening by which access is had from the furnace chamber to the duct 12.

A tendency for the current path through the duct 12 to become concentrated at one side of the duct or the other, as seen in plan so that this concentration of current is nearer to the electrode 13 or to the electrode 14, may be initiated by an extraneous cooling influence operating with regard to the side of the duct from which the current is displaced, or by asymmetry of heating in the chamber 10 with respect to the point 28.

For example, if the current tends to become concentrated along the right hand side of the duct 12 as seen in the drawing the slider 25 would be moved to the right.

Detection of the occurrence of such concentration of the current on one side or the other of the duct is effected by comparison of the magnitudes of the currents flowing to the main electrodes 13 and 14 through the leads 21 and 22.

I may for example provide current transformers CT1 and CT2 in the leads 21 and 22 respectively, the outputs from these transformers feeding a differential ammeter A1 of any known or suitable type which furnishes an indication as to the differences in the R.M.S. values of the two currents irrespective of phase.

To correct for this shift the slider 25 of the inductance L1 is adjusted appropriately along the tapping points 27 to equalise the two currents in the leads 21 and 22. It will be appreciated that there will normally be some delay before this adjustment takes effect so that if the differential ammeter A1 indicates a departure from its zero or datum position it is appropriate to adjust the slider 25 and leave it in an adjusted position for some time (say 15 to 30 minutes) and then again read the ammeter to see whether the inequality in the two currents has been corrected.

I may provide a further current transformer CT3 for measuring the main current in the lead 22 and a current transformer CT4 for measuring the current flowing to the electrodes 15.

Referring to Figures 9 and 10 the voltage applied across the poles 23 and 24 from the transformer T2 is represented by the vector $VT_2$ and it is assumed that the slider 25 of the choke L1 is in its mid-position, so that the total voltage $VT_1$ supplied from the transformer T1 is developed between the slider 25 and each end of the inductance L1 as represented by the vectors $$\frac{VT_1}{2}$$

in Figure 9.

The voltage existing between the electrodes 15 and each of the two electrodes 13 and 14 are thus represented by the broken line vectors 13—15 and 14—15 as shown in Figure 9.

It will be observed that these vectors are equal in magnitude to each other and the phase angles $\phi 1$ and $\phi 2$ between these vectors and the voltage 13—14 applied across the main electrodes are also equal to each other.

Figure 10 represents the conditions which exist when the slider 25 is displaced from the mid-position.

The voltage supplied from the transformer T1 is maintained at its former value $VT_1$ as represented by 13—14, but the vector 13—15 has become greater in magnitude than the vector 14—15 and its phase angle $\phi 3$ with respect to the vector 13—14 has decreased whereas the phase angle $\phi 4$ pertaining to the vector 14—15 has increased.

It will thus be evident that displacement of the slider 25 can be utilized to correct displacement of the current path through the duct towards one side or the other.

Referring to Figures 6 and 7 wherein parts corresponding to those of Figures 1 to 5 are designated by like numerals of reference, the electrodes 15 of the further chamber have been replaced by a single electrode 70 which is disposed symmetrically, as seen in plan, in relation to the opening 39 by which glass enters the further chamber 11 from the chamber 10.

In Figure 8 yet another alternative construction is illustrated wherein again parts corresponding to those shown in Figures 1 to 5 have been designated by like numerals of reference.

In this case the electrodes 15 are replaced by electrodes such as that shown at 71 disposed at the sides of the duct 12 adjacent to the opening 39 which leads to the upper chamber 11. The latter contains a plurality of burners 72 preferably directed somewhat upwardly towards the crown 52 so that they do not cause irritation to the surface of the glass in the chamber 11. The burner 72 may be fed with a gaseous fuel.

Instead of reading the current difference on the ammeter A1 and adjusting the slider 25 manually, the adjustment may be performed automatically by the adoption of a circuit as illustrated in Figure 5.

In this arrangement the current transformers CT1 and CT2 are connected to a comparison circuit indicated generally at 55. This circuit comprises a load resistor 73 centre tapped at 74, the two halves of this resistor being connected to the secondary windings of the current transformers CT1 and CT2 through the intermediary of rectifiers 75 and 76 which provide rectified voltages in opposition to each other across the two halves of the resistor. Condensers 77 and 78 in the rectifier circuits provide smoothing of the rectified voltages.

The ends of the load resistor 73 are connected by way of lines 56 and 57 to a differential relay 58 having an armature 79 normally retained in the mid-position shown but movable on to either contact 80 or 81 according to whether the line 56 is positive or negative with respect to the line 57.

Contacts 80 and 81 are connected by way of lines 59 and 61 to a reversible regulator motor 62 and the armature 79 is connected by way of line 60 to one of a pair of terminals 64 energised from a mains supply. The other terminal 64 is connected through line 63 to the reversible regulator motor 62.

As indicated by the broken line 65 the motor 62 is coupled mechanically to slider 25 of inductance L1, the terminals of this inductance and slider being connected as indicated in Figure 4.

In order to prevent hunting there is provided in operative association with the slider 25 a time delay switch means. This switch means may comprise switch contacts 82 which are normally open but are momentarily closed by a cam 83 driven from the motor 62 once during the passage of the movable contact of the slider 25 between successive tapping points or contacts 27 of the inductance L1. The temporary closure of contacts 82 serves to energise delayed action relay 84 having contacts 84a and 84b, so that these contacts are opened upon arrival of the slider at the tapping point of contact 27 towards which it is moving, and remain open for a sufficient time to allow the changed position of the slider to take effect in restoring the currents in lines 21 and 22 towards equality. It will be understood that if the degree of restoration has been insufficient the slider 25 will then move automatically to the next tapping point in contact 27 and ultimately will remain on that contact which produces the requisite degree of equality in the currents in lines 21 and 22.

In operation of the furnace the rate of throughput is controlled by controlling the rate of withdrawal of the glass from the chamber 11 and the current between the main electrodes 13 and 14 in the chamber 10 is adjusted so as to produce in this chamber dynamic conditions of force in the upwardly moving current of glass in the central region whereby elemental volumes of glass in this region having more than a certain seed content (and hence effectively a lower density) are allowed to continue their upward movement despite the downward pull exerted by withdrawal of the glass through the opening 37. Other elemental volumes of glass having less than this seed content (considered acceptable for fabrication of the glass) and hence having a greater density are drawn downwardly by the pull exerted in opposition to the upward convective force and consequently the glass withdrawn from the chamber 10 through the duct contains not more than an acceptable quantity of seed.

In order to promote this manner of operation of the furnace more effectively I may provide cooling means in the form of ducts or pipes 53 provided with orifices for blowing cold air or other cold fluid against the blocks 54 which border on the ends of the opening 37. The pipes or ducts 53 are conveniently disposed beneath the bottom wall of the chamber 10, as indicated one on each side of the bottom wall 55 of the duct.

In consequence of the cooling of the blocks 54 the layers of glass adjacent thereto are cooled and the main current path between the electrodes 13 and 14 instead of tending to be concentrated near the floor of the chamber 10 is raised somewhat (owing to the increasing electrical resistance of glass as it is cooled). The layers of glass immediately above the opening 20 therefore are somewhat cooler than would otherwise be the case and the region of maximum temperature is displaced upwardly so that the downward pull exerted by withdrawal of the glass through the opening is applied to the region of maximum temperature (and hence maximum fluidity) through the intermediary of these somewhat cooler layers of glass.

This tends to spread the downward pull somewhat more widely than would otherwise be the case.

Under normal conditions of working for borosilicate glass the temperature of the glass in the central region of the chamber 10 and somewhat above the opening may be of the order of 1600° C. or more and the temperature of this glass may fall as it is withdrawn through the duct at a controlled rate depending upon the auxiliary current passing through the glass in the duct and further chamber 23 so that when it reaches this latter chamber the final temperature lies in the range 1360° C. or thereabouts to 1380° C. or thereabouts. This is an appropriate temperature for the fabrication of this glass when delivered from the further chamber 11 in connection with operations such as glass pressing. For pressing and similar operations the viscosity of the glass in the chamber 11 should be $10^3$ poises or thereabouts.

The crown of the chamber 11 should not be heated to a temperature which is greater or substantially greater than the glass contained therein so as to avoid the risk of seed or boil being formed in this glass; preferably the temperature should be within 30° C. or less of the glass temperature.

The value of the auxiliary current may be controlled in relation to the throughput in order to maintain the temperature of the glass in the further chamber 11 within the desired limits by varying the voltage furnished by transformer T2 which is a variable transformer. The voltage furnished by the transformer T1 which is a variable transformer may be varied so that if the throughput is raised the main current between the electrodes 13 and 14 is raised to attain a somewhat higher temperature in the chamber 10.

Figure 11:
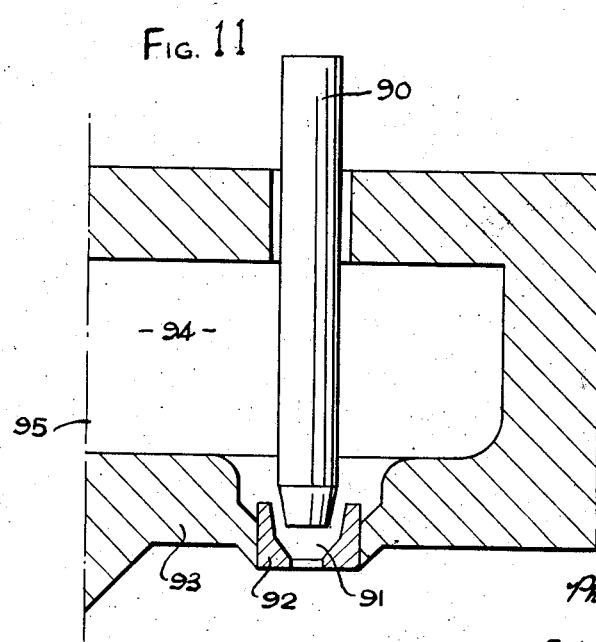
Figure 11 is a view in vertical cross-section through one form of feeder chamber which may be utilized with the furnace illustrated in Figures 1 to 3 or Figures 6 and 7.

Variation of the throughput is effected by variation in the rate of operation of the feeder device which is well known in the art, being shown in U.S. Patent 2,283,188, dated May 19, 1942, and British Patent 671,405 of May 7, 1952, and is shown for purposes of illustration in Figure 11 wherein a vertically reciprocating plunger 90 serves to expel glass through an orifice 91 in a bushing 92 mounted in the bottom wall 93 of the feeder chamber 94. The chamber 94 would receive at its inlet end 95, glass emergent from the outlet 47 of the further chamber incorporated in the constructions illustrated in Figures 1, 2, 6 and 7 and the rate of expulsion of glass from the feeder chamber would thus determine the difference of levels between the glass in this chamber and the further chamber 11 thereby in turn controlling the rate of withdrawal of glass along the duct 12 and downwardly through the opening 37.

Typical values for the main and auxiliary currents for the furnace dimensions and glass temperatures given are auxiliary current about 75 amperes, main current about 1200 amperes.

What I claim then is:

1. A method of refining glass comprising heating a body of glass melt by passing an alternating electric current horizontally through it between electrodes of opposite polarity disposed at opposite ends of a furnace chamber and spaced apart horizontally from each other by a distance sufficient to promote an upward convection flow of molten glass in a central region between said electrodes, withdrawing molten glass from beneath said central region over a plan area having a length lying in the range one eighth to one half of the horizontal spacing between said electrodes and having a width at least equal to one half the width of the furnace chamber, thereby establishing a downward flow in opposition to said upward convection current, and regulating at least one of the factors of heating current and rate of withdrawal of the molten glass to establish respectively a degree of fluidity of the molten glass and a controlled preponderance of downward pull over upthrust in said central region, producing downward extraction of only glass having satisfactorily low seed content.

2. A method of refining glass comprising, heating a body of glass melt by passing a main alternating electric current horizontally through it between electrodes of opposite polarity disposed at opposite ends of a furnace chamber and spaced apart horizontally from each other by a distance sufficient to promote an upward convection flow of molten glass in a central region between said electrodes, withdrawing molten glass from beneath said central region to establish a downward flow in opposition to said upward convection current, and regulating at least one of the factors of said main current and rate of withdrawal of the molten glass to establish respectively a degree of fluidity of the molten glass and a controlled preponderance of downward pull over upthrust in said central region, producing downward extraction of elemental volumes of glass having satisfactorily low seed content and permitting of upward movement of elemental volumes of glass having a greater seed content for further circulation and refining in said furnace chamber, causing the withdrawn glass to flow along a duct to a further chamber heating said withdrawn glass in said duct by passing an auxiliary alternating electric current through it longitudinally of said duct by means of an auxiliary electrode spaced along said duct from said opening to produce a controlled fall in glass temperature between said central region of said furnace chamber and said further chamber, detecting the magnitudes of the total currents communicated to the glass in said furnace chamber at said opposite ends thereof and correcting any inequality in said total currents by varying an electrical quantity in a circuit connecting said electrodes and said auxiliary electrode.

3. A method of refining glass comprising, heating a body of glass melt by passing a main alternating electric current horizontally through it between main electrodes of opposite polarity disposed at opposite ends of a furnace chamber and spaced apart horizontally from each other by a distance sufficient to promote an upward convection flow of molten glass in a central region between said electrodes, withdrawing molten glass from beneath said central region to establish a downward flow in opposition to said upward convection current, and regulating at least one of the factors of said main current and rate of withdrawal of the molten glass to establish respectively a degree of fluidity of the molten glass and a controlled preponderance of downward pull over upthrust in said central region, producing downward extraction of elemental volumes of glass having a satisfactorily low seed content and permitting of upward movement of elemental volumes of glass having a greater seed content for further circulation and refining in said furnace chamber, causing the withdrawn glass to flow along a duct to a further chamber, heating said withdrawn glass in said duct by passing an auxiliary alternating electric current through it longitudinally of said duct by means of an auxiliary electrode spaced along said duct from said opening to produce a controlled fall in glass temperature between said central region of said furnace chamber and said further chamber, detecting the magnitudes of the total currents communicated to the glass in said furnace chamber at said opposite ends thereof and correcting any inequality in said total currents by varying the phase angle between the voltage applied between said auxiliary electrode and one of said main electrodes and the voltage applied between said main electrodes, relatively to the phase angle between the voltage applied between said auxiliary electrode and the other of said main electrodes and said voltage applied between said main electrodes.

4. A method of refining glass comprising, heating a body of glass melt by passing a main alternating electric current horizontally through it between electrodes of opposite polarity disposed at opposite ends of a furnace chamber and spaced apart horizontally from each other by a distance sufficient to promote an upward convection flow of molten glass in a central region between said electrodes, withdrawing molten glass from beneath said central region to establish a downward flow in opposition to said upward convection current, and regulating at least one of the factors of said main current and rate of withdrawal of the molten glass to establish respectively a degree of fluidity of the molten glass and a controlled preponderance of downward pull over upthrust in said central region, producing downward extraction of elemental volumes of glass having a satisfactorily low seed content and permitting of upward movement of elemental volumes of glass having a greater seed content for further circulation and refining in said furnace chamber, causing the withdrawn glass to flow along a duct to a further chamber, heating said withdrawn glass in said duct by passing an auxiliary alternating electric current through it longitudinally of said duct by means of an auxiliary electrode spaced along said duct from said opening to produce a controlled fall in glass temperature between said central region of said furnace chamber and said further chamber, detecting the magnitudes of the total currents communicated to the glass in said furnace chamber at said opposite ends thereof, and correcting any inequality in said total currents by adjusting the point of connection between a supply circuit for said auxiliary electrode and a supply circuit for said main electrodes through a range of positions extending from one side to the other side of an electrical centre between said main electrodes.

5. A method of refining glass comprising, heating a body of glass melt by passing a main alternating electric current through it between main electrodes at respectively opposite ends of an outlet in a furnace chamber, passing an auxiliary alternating electric current through said glass melt from said opposite ends and thence through a duct longitudinally thereof to an auxiliary electrode to provide a controlled fall in glass temperature along said duct, detecting the magnitudes of the total currents communicated to said glass melt at said opposite ends of said opening and regulating said total currents by varying the phase angle between the voltage applied between said auxiliary electrode and one of said main electrodes and the voltage applied between said main electrodes, relatively to the phase angle between the voltage applied between said auxiliary electrode and the other of said main electrodes and said voltage applied between said main electrodes.

6. A method of refining glass comprising, heating a body of glass melt by passing a main alternating electric current through it between main electrodes at respectively opposite ends of an outlet in a furnace chamber, passing an auxiliary alternating electric current through said glass melt from said opposite ends and thence through a duct longitudinally thereof to an auxiliary electrode to provide a controlled fall in glass temperature along said duct, detecting the magnitudes of the total currents communicated to said glass melt at said opposite ends of said opening and regulating said total currents by adjusting the point of connection between a supply circuit for said auxiliary electrode and a supply circuit for said main electrodes through a range of positions extending from one side to the other side of the electrical centre between said main electrodes.

7. In a glass refining furnace comprising a furnace chamber containing horizontally spaced main electrodes and means for supplying an alternating electric current thereto to pass through and heat a body of molten glass contained in said chamber; the provision in combination of a bottom wall to said furnace chamber having an opening in the central region thereof between said electrodes and of a length measured parallel to the current path between said electrodes which lies in the range one eighth to one half of the horizontal spacing between said electrodes and of a width which is at least half the width of the furnace chamber, and means for varying at least one of the factors of throughput of glass and current passing through said body of molten glass between said electrodes.

8. In a glass refining furnace comprising a furnace chamber containing horizontally spaced main electrodes, a main supply circuit for supplying a main alternating current thereto to pass through and heat a body of molten glass contained in said chamber; the provision in combination of a bottom wall to said furnace chamber having an opening in the central region thereof between said electrodes and of a length measured parallel to the current path between said electrodes which lies in the range one eighth to one half of the horizontal spacing between said electrodes and of a width which is at least half the width of the furnace chamber, a further chamber structure defining a duct connecting said further chamber with said furnace chamber at said opening, an auxiliary electrode at a position spaced horizontally of said duct from said opening, an auxiliary supply circuit connected to said auxiliary electrode for supplying auxiliary current thereto to flow through glass in said duct longitudinally thereof, means for detecting the magnitudes of the total currents communicated to said body of molten glass in said furnace chamber at said main electrodes, and means for adjusting the alternating voltage applied to said auxiliary electrode from said auxiliary supply circuit to equalise or reduce the difference between the magnitudes of said total currents.

9. In a glass refining furnace comprising a furnace chamber containing horizontally spaced main electrodes, a main supply circuit for supplying the main alternating current to heat a body of molten glass contained in said chamber, a further chamber and a duct connecting said further chamber with said furnace chamber along which duct molten glass can flow to said further chamber, the provision of an auxiliary electrode disposed at a position spaced from said opening along said duct, an auxiliary supply circuit connected to said auxiliary electrode and to said main supply circuit, means for detecting the magnitudes of the total currents communicated to said body of molten glass in said furnace chamber at said main electrodes, and means for adjusting the alternating voltage applied to said auxiliary electrode from said auxiliary supply circuit to equalise or reduce the difference between the magnitudes of said total currents.

10. In a glass refining furnace comprising a furnace chamber containing horizontally spaced electrodes, a main supply circuit for supplying a main alternating current thereto and an auxiliary supply circuit for supplying an auxiliary alternating electric current thereto to pass through and heat a body of molten glass contained in said chamber, a further chamber, and a duct connecting said further chamber with said furnace chamber, along which duct molten glass can flow to said further chamber; the provision of an auxiliary electrode disposed at a position spaced from said opening along said duct, said auxiliary supply circuit being connected to said auxiliary electrode and to said main supply circuit through means enabling the point of connection between said supply circuits to be adjusted through a range of positions extending from one side to the other side of the electrical centre between said main electrodes.

11. In a glass refining furnace comprising a furnace chamber containing horizontally spaced main electrodes and means for supplying a main alternating current thereto to pass through and heat a body of molten glass contained in said chamber; the provision in combination of a bottom wall to said furnace chamber having an opening in the central region thereof between said electrodes and of a length measured parallel to the current path between said electrodes which lies in the range one eighth to one half of the horizontal spacing between said electrodes and of a width which is at least half the width of the furnace chamber, means for cooling said bottom wall at a position adjacent to the ends of said opening to raise the region of maximum glass temperature to a level in the furnace chamber above that which it would occupy in the absence of cooling by such means and, means for varying at least one of the factors of throughput of glass and current passing through said body of molten glass between said electrodes.

12. In a glass refining furnace comprising a furnace chamber containing horizontally spaced main electrodes and means for supplying a main alternating current thereto to pass through and heat a body of molten glass contained in said chamber; the provision in combination of a bottom wall to said furnace chamber having an opening in the central region thereof between said electrodes and of a length measured parallel to the current path between said electrodes which lies in the range one eighth to one half of the horizontal spacing between said electrodes and of a width which is at least half the width of the furnace chamber, a further chamber structure defining a duct connecting said further chamber with said furnace chamber at said opening, means for cooling said bottom wall at a position adjacent to the ends of said opening to raise the region of maximum glass temperature to a level in the furnace chamber above that which it would occupy in the absence of cooling by such means, an auxiliary electrode at a position spaced longitudinally of said duct from said opening, an auxiliary supply circuit connected to said auxiliary electrode for supplying auxiliary current thereto to flow through glass in said duct longitudinally thereof, means for detecting the magnitudes of the total currents communicated to said body of molten glass in said furnace chamber at said main electrodes, and means for adjusting the alternating voltage applied to said auxiliary electrode from said auxiliary supply circuit to equalise or reduce the difference between the magnitudes of said total currents, and means for varying at least one of the factors of throughput of glass and current passing through said body of molten glass between said electrodes.

13. A method of refining glass comprising, heating a body of glass melt by passing a main alternating electric current horizontally through it between electrodes of opposite polarity disposed at opposite ends of a furnace chamber and spaced apart horizontally from each other by a distance sufficient to promote an upward convection flow of molten glass in a central region between said electrodes, withdrawing molten glass from beneath said central region to establish a downward flow in opposition to said upward convection current, and regulating at least one of the factors of said main current and rate of withdrawal of the molten glass to establish respectively a degree of fluidity of the molten glass and a controlled preponderance of downward pull over upthrust in said central region, producing downward extraction of elemental volumes of glass having satisfactorily low seed content and permitting of upward movement of elemental volumes of glass having a greater seed content for further circulation and refining in said furnace chamber, causing the withdrawn glass to flow along a duct to a further chamber heating said withdrawn glass in said duct by passing an auxiliary alternating electric current through it longitudinally of said duct by means of an auxiliary electrode spaced along said duct from said opening to produce a controlled fall in glass temperature between said central region of said furnace chamber and said further chamber, detecting the magnitudes of the total currents communicated to the glass in said furnace chamber at said opposite ends thereof and correcting any inequality in said total currents by varying the relative magnitudes of the voltages between said auxiliary electrode and said main electrodes respectively.

14. A method of refining glass comprising, heating a body of glass melt by passing a main alternating electric current horizontally through it between main electrodes of opposite polarity disposed at opposite ends of a furnace chamber and spaced apart horizontally from each other by a distance sufficient to promote an upward convention flow of molten glass in a central region between said electrodes, withdrawing molten glass from beneath said central region to establish a downward flow in opposition to said upward convection current, and regulating at least one of the factors of said main current and rate of withdrawal of the molten glass to establish respectively a degree of fluidity of the molten glass and a controlled preponderance of downward pull over upthrust in said central region, producing downward extraction of elemental volumes of glass having a satisfactorily low seed content and permitting of upward movement of elemental volumes of glass having a greater seed content for further circulation and refining in said furnace chamber, causing the withdrawn glass to flow along a duct to a further chamber, heating said withdrawn glass in said duct by passing an auxiliary alternating electric current through it longitudinally of said duct by means of an auxiliary electrode spaced along said duct from said opening to produce a controlled fall in glass temperature between said central region of said furnace chamber and said further chamber, detecting the magnitudes of the total currents communicated to the glass in said furnace chamber at said opposite ends thereof and correcting any inequality in said total currents by varying the phase angle between the voltage applied between said auxiliary electrode and one of said main electrodes and the voltage applied between said main electrodes relatively to the phase angle between the voltage applied between said auxiliary electrode and the other of said main electrodes and said voltage applied between said main electrodes, and by concomitantly varying the relative magnitude of said voltages between said auxiliary electrode and said one and said other of said main electrodes respectively as an inverse function of said respective phase angles.

15. A method of refining glass comprising, heating a body of glass melt by passing a main alternating electric current through it between main electrodes at respectively opposite ends of an outlet in a furnace chamber, passing an auxiliary alternating electric current through said glass melt from said opposite ends and thence through a duct longitudinally thereof to an auxiliary electrode to provide a controlled fall in glass temperature along said duct, detecting the magnitudes of the total currents communicated to said glass melt at said opposite ends of said opening and regulating said total currents by varying the relative magnitudes of the voltages between said auxiliary electrode and said main electrodes respectively.

16. A method of refining glass comprising, heating a body of glass melt by passing a main alternating electric current through it between main electrodes at respectively opposite ends of an outlet in a furnace chamber, passing an auxiliary alternating electric current through said glass melt from said opposite ends and thence through a duct longitudinally thereof to an auxiliary electrode to provide a controlled fall in glass temperature along said duct, detecting the magnitudes of the total currents communicated to said glass melt at said opposite ends of said opening and regulating said total currents by varying the phase angle between the voltage applied between said auxiliary electrode and one of said main electrodes and the voltage applied between said main electrodes, relatively to the phase angle between the voltage applied between said auxiliary electrode and the other of said main electrodes and said voltage applied between said main electrodes, and by concomitantly varying the relative magnitudes of said voltages between said auxiliary electrode and said one and said other of said main electrodes respectively is an inverse fuction of said respective phase angles.

17. In a glass refining furnace comprising a furnace chamber containing horizontally spaced main electrodes, a main supply circuit for supplying the main alternating current to heat a body of molten glass contained in said chamber, a further chamber and a duct connecting said further chamber with said furnace chamber along which duct molten glass can flow to said further chamber; the provision of an auxiliary electrode disposed at a position spaced from said opening along said duct, an auxiliary supply circuit connected to said auxiliary electrode and to said main supply circuit, means for detecting the magnitudes of the total currents communicated to said body of molten glass in said furnace chamber at said main electrodes, and means for regulating said total currents comprising, means for varying the phase angle between the voltage applied between said auxiliary electrode and one of said main electrodes and the voltage applied between said main electrode relatively to the phase angle between the voltage applied between said auxiliary electrode and the other of said main electrodes and said voltage applied between said main electrodes.

18. In a glass refining furnace comprising a furnace chamber containing horizontally spaced main electrodes, a main supply circuit for supplying the main alternating current to heat a body of molten glass contained in said chamber, a further chamber and a duct connecting said further chamber with said furnace chamber along which duct molten glass can flow to said further chamber; the provision of an auxiliary electrode disposed at a position spaced from said opening along said duct, an auxiliary supply circuit connected to said auxiliary electrode and to said main supply circuit, means for detecting the magnitudes of the total currents communicated to said body of molten glass in said furnace chamber at said main electrodes, and means for regulating said total currents comprising, means for varying the relative magnitudes of the voltages between said auxiliary electrode and said main electrodes respectively.

19. A method of refining glass comprising heating a body of glass melt by passing a main alternating current through it between main electrodes at respectively opposite ends of an outlet in a furnace chamber, withdrawing glass through said outlet from said body in a direction transverse to said main alternating current flow at a position in the current path between said main electrodes, and causing said withdrawn glass to flow along a duct, passing an auxiliary alternating electric current through said body of glass melt and through glass within said duct longitudinally of said duct to an auxiliary electrode to provide a controlled fall in glass temperature along said duct, detecting the magnitudes of the total currents communicated to said body of glass melt at said opposite ends of said outlet and regulating said total currents by varying an electrical quantity in a circuit containing said main electrodes and said auxiliary electrodes.

References Cited in the file of this patent

UNITED STATES PATENTS

| | | |
|---|---|---|
| 1,552,555 | Grauel | Sept. 8, 1925 |
| 1,944,855 | Wadman | Jan. 23, 1934 |
| 2,283,188 | Cornelius | May 19, 1942 |
| 2,413,037 | De Voe | Dec. 24, 1946 |
| 2,490,339 | De Voe | Dec. 6, 1949 |
| 2,559,683 | Skinner et al. | July 10, 1951 |

FOREIGN PATENTS

| | | |
|---|---|---|
| 865,278 | France | Feb. 17, 1941 |
| 251,579 | Switzerland | Aug. 16, 1948 |
| 251,580 | Switzerland | Aug. 16, 1948 |
| 615,760 | Great Britain | Jan. 11, 1949 |
| 620,763 | Great Britain | Mar. 30, 1949 |